United States Patent
Rockwell et al.

(10) Patent No.: US 6,343,571 B1
(45) Date of Patent: *Feb. 5, 2002

(54) FUEL EMULSION DETECTION METHOD AND SYSTEM FOR AN ELECTRONICALLY CONTROLLED ENGINE

(75) Inventors: Andrew D. Rockwell, East Peoria; Alan L. Schweigert, Chillicothe, both of IL (US)

(73) Assignee: Clean Fuels Technology, Inc., Reno, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,853

(22) Filed: Dec. 17, 1998

(51) Int. Cl.$^7$ ................................................. F02B 77/00
(52) U.S. Cl. .................................. 123/25 C; 123/198 D
(58) Field of Search ............................ 123/1 A, 25 A, 123/198 D, 198 DB, 25 C

(56) References Cited

U.S. PATENT DOCUMENTS

| | | | |
|---|---|---|---|
| 4,175,635 A | 11/1979 | Thomas | 180/287 |
| 4,378,321 A | 3/1983 | Miller | 261/41 D |
| 4,553,127 A | 11/1985 | Issa | 340/64 |
| 4,594,968 A | 6/1986 | Degobert et al. | 123/1 A |
| 4,706,630 A | 11/1987 | Wineland et al. | 123/478 |
| 4,869,219 A | 9/1989 | Bremmer et al. | 123/383 |
| 4,909,225 A | 3/1990 | Gonze et al. | 123/494 |
| 4,974,552 A | 12/1990 | Sickafus | 123/1 A |
| 4,989,570 A * | 2/1991 | Kuribara et al. | 123/494 |
| 5,016,180 A | 5/1991 | Fujisawa | 364/431.04 |
| 5,138,986 A | 8/1992 | Aguilar | 123/179.3 |
| 5,179,926 A * | 1/1993 | Ament | 123/494 |
| 5,186,149 A | 2/1993 | Kitajima et al. | 123/491 |
| 5,233,944 A | 8/1993 | Mochizuki | 123/1 A |
| 5,237,978 A | 8/1993 | Bailey | 123/515 |
| 5,282,451 A * | 2/1994 | Yoshida et al. | 123/406 |
| 5,303,842 A | 4/1994 | Harp et al. | 220/562 |
| 5,390,640 A | 2/1995 | Saito et al. | 123/491 |
| 5,701,863 A | 12/1997 | Cemenska et al. | 123/198 D |

FOREIGN PATENT DOCUMENTS

| | | | |
|---|---|---|---|
| DE | 34 10714 | 3/1984 | F02D/19/06 |
| DE | 44 12 965 | 4/1994 | F02D/19/12 |
| GB | 1031295 | 10/1961 | |
| JP | 62255543 | 11/1987 | |
| JP | 05125973 | 5/1993 | |
| WO | 90/06427 | 6/1990 | |

* cited by examiner

Primary Examiner—Willis R. Wolfe
Assistant Examiner—Hai Huynh

(57) ABSTRACT

A system and method for the identification of the fuel used in an electronically controlled internal combustion engine that may utilize an advanced fuel such as a fuel emulsion is provided. Where an unauthorized fuel is determined to be used in the engine, the electronic control module disables the engine by limiting fuel flow to the injectors.

2 Claims, 2 Drawing Sheets

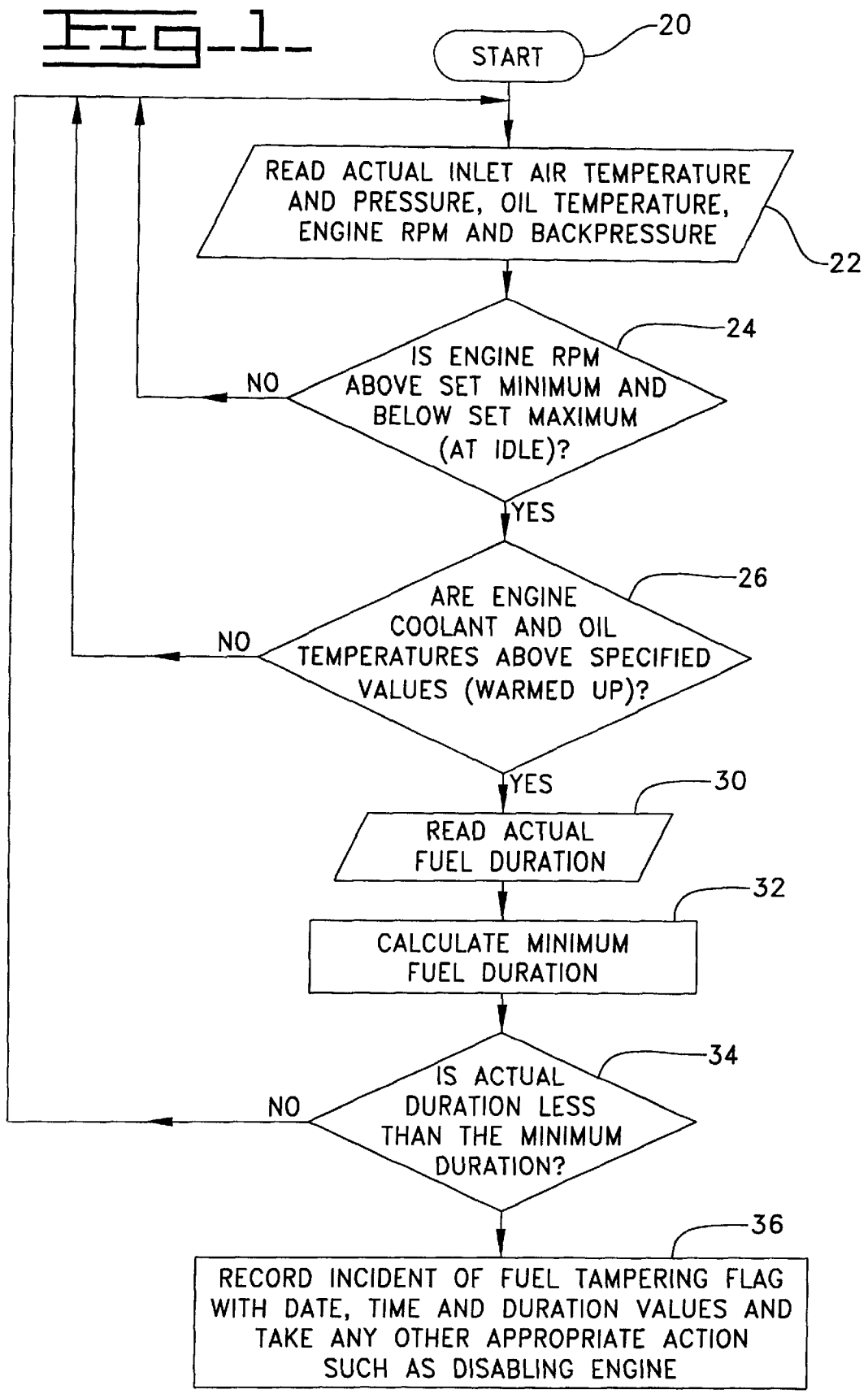

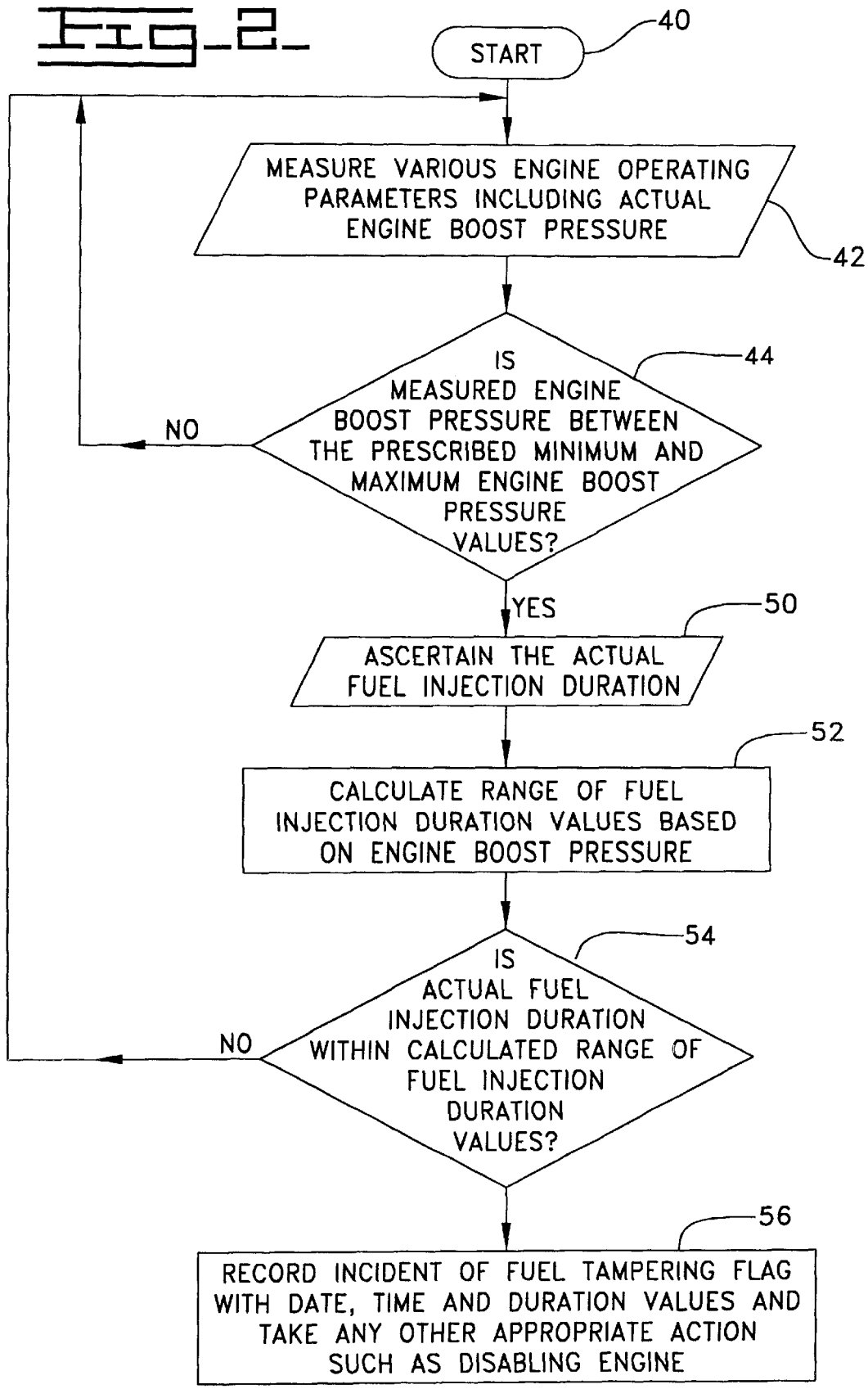

FUEL EMULSION DETECTION METHOD AND SYSTEM FOR AN ELECTRONICALLY CONTROLLED ENGINE

FIELD OF THE INVENTION

The present invention relates to a fuel detection system or identification system for an electronically controlled engine, and more particularly, to a system and method for the detection and identification of the fuel used in electronically controlled internal combustion engines. If the detected fuel is identified as an improper or unauthorized fuel, the system terminates engine operation or otherwise disables the engine.

BACKGROUND

Recent fuel developments for internal combustion engines have resulted in a number of fuel emulsions comprised essentially of a carbon-based fuel, water, and various additives. These fuel emulsions may play a key role in finding a cost-effective way for internal combustion engines including, but not limited to, compression ignition engines (i.e. diesel engines) to achieve the reduction in emissions below the mandated levels without significant modifications to the engines, fuel systems, or existing fuel delivery infrastructure.

Advantageously, fuel emulsions containing water tend to reduce or inhibit the formation of nitrogen oxides (NOx) and particulates (i.e. combination of soot and hydrocarbons) by altering the way the fuel is burned in the engine. Specifically, the fuel emulsions are burned at somewhat lower temperatures than a comparable non-aqueous fuel due to the presence of water. This, coupled with the realization that at higher peak combustion temperatures, more NOx are typically produced in the engine exhaust, one can readily understand the advantage of using water-containing fuel emulsions.

Thus, the reduction in NOx is achieved using aqueous fuels primarily because a water-containing or aqueous fuel emulsion has a lower peak combustion temperature. The actual reduction achieved, however, depends on a number of factors including the composition of the fuel emulsion (e.g. fuel to water ratio), engine control capabilities, ignition technology, engine operating conditions, etc. Moreover, having a lower peak combustion temperature does not necessarily mean that the aqueous fuel is providing less total energy or doing less work for a given mass of hydrocarbon fuel. Rather, the addition of water only requires a proportional increase in the volume of aqueous fuel emulsion to be injected in order to achieve the equivalent amount of work. However, as the volume of fuel that has to be injected increases, the engine performance considerations change. For example, the additional volume of aqueous fuel required in order to achieve the same amount of work imposes additional constraints and other design considerations in the fuel delivery systems, fuel control systems, fuel storage systems and other related systems in the internal combustion engine. Thus, where aqueous fuel emulsions are used, selected changes to the engine system must be incorporated. However, such changes are beneficial only if the aqueous fuel emulsions are actually used and are often detrimental to the operation of the engine if more conventional fuels are used.

Another problem with developing compression ignition or diesel engines to run on a fuel emulsion is that if a particular engine rating is developed, certified and sold as a fuel emulsion engine it is still capable of operating on conventional fuels such as a diesel fuel. An engine designed for a water fuel emulsion typically produces higher power and significantly higher emissions when the same volume of a conventional fuel, such as diesel fuel, is used. Unfortunately, some engine owners and operators may find an incentive to operate a fuel emulsion certified engine on diesel fuel as engine response may be faster coupled with an overall increase in power since the fuel emulsion has a significantly lower heating value than diesel fuel. Consequently, it would be advantageous if the engine could incorporate some form of protection against such fuel tampering.

It is also anticipated that various regulatory agencies may require anti-tampering devices to ensure that such an engine, certified to run on a fuel emulsions, are not run on a more conventional fuels, such as diesel fuels. In addition, for reliability and warranty related purposes, the engine manufacturer and chassis manufacturer want to ensure that diesel fuel is not used to power an engine designed for an aqueous fuel emulsion. Thus, there is a need for such fuel tampering or anti-tampering devices that can identify the fuel being used in an internal combustion engine and that disable the engine if an improper fuel is detected.

The related art fuel detection or anti-tampering systems and methods include the system and method disclosed in U.S. Pat. No. 5,701,863 (Cemenska et al.). The Cemenska et al. disclosure provides for an anti-tampering system and method that utilizes a fuel sensing device to detect physical or optical properties of a fuel, such as a fuel emulsion. Where the detected fuel is not a fuel emulsion, the engine is disabled. See also U.S. Pat. Nos. 5,186,149; 4,594,968; 4,706,630; 4,909,225, 4,974,552; 5,237,978; and 5,233,944 all which utilize physical property or optical property fuel sensors disposed within the fuel system to identify the fuel based on the alcohol content within the fuel or other fuel characteristic. Except for the Cemenska et al. reference, the related art systems are not suitable for use with a fuel emulsion. Moreover, all of the related art systems and methods require additional hardware, such as fuel sensors, which add to the cost of the engine and otherwise introduce additional reliability and maintainability concerns.

DISCLOSURE OF THE INVENTION

The present invention addresses the above and other needs by providing an improved method and system for the detection and identification of the fuel being used in an electronically controlled engine that is adapted to utilize a fuel emulsion. As disclosed herein, if the fuel used in the engine is identified as a fuel other than a fuel emulsion, the fuel control system restricts fuel flow to the injectors or otherwise disables the engine operation.

In one aspect, the present invention may be characterized as a fuel detection or identification system incorporating fuel identification logic within the engine control module (ECM) for preventing the use of selected fuels in an internal combustion engine, the engine being suitable for operating on a fuel emulsion. The fuel identification system includes at least one engine sensor adapted to measure a prescribed engine operating characteristic or parameter and an engine control module adapted to receive input from the engine sensor(s) corresponding to the engine operating characteristic(s). The engine control module (ECM) is particularly adapted for metering the fuel delivered to the fuel injectors of the engine based, in part on the measured engine parameter(s) and is further adapted to differentiate between a fuel emulsion and fuels other than a fuel emulsion based on said fuel quantity delivered to the engine at specified engine operating conditions. As indicated above, if the fuel used in the engine is identified as a fuel other than a fuel emulsion, the ECM or fuel control system restricts fuel flow to the fuel injectors or otherwise disables the engine operation.

Notable features of the disclosed fuel detection or identification system include the use of one or more sensors to measure the engine speed, inlet air temperature, engine oil temperature, engine coolant temperature, manifold pressure, or boost pressure, or a combination of the aforementioned engine operating parameters. Using the measured engine operating parameters, the disclosed fuel detection system differentiates between a fuel emulsion and a fuel other than a fuel emulsion based on the fuel quantity delivered at specified engine operating conditions, for example, engine idling conditions or a particular engine boost condition.

The present invention may also be characterized as a method for preventing the use of selected other fuels in an internal combustion engine adapted to use a fuel emulsion. The disclosed method includes the steps of: (a) measuring a prescribed engine operating characteristic or parameter; (b) metering a fuel delivered to the engine based, in part on the engine operating characteristic; (c) determining the fuel used in the engine based on the fuel quantity delivered to the fuel injectors at specified engine operating conditions; and (d) disabling the engine when the fuel is determined to be other than a fuel emulsion. Preferably, the engine is disabled by limiting or restricting the fuel flow to the fuel injectors of the engine.

Additional features of the disclosed method include the measuring additional engine operating parameters such as engine speed, inlet air temperature, engine oil temperature, engine coolant temperature, manifold pressure, or boost pressure, or a combination of the aforementioned engine operating parameters. Using the measured engine operating parameters, the disclosed method then determines the fuel being used based on the fuel quantity delivered at specified engine operating conditions, for example, engine idling conditions or a particular engine boost condition.

BRIEF DESCRIPTION OF THE DRAWINGS

The above and other aspects, features, and advantages of the present invention will be more apparent from the following, more descriptive description thereof, presented in conjunction with the following drawings, wherein:

FIG. 1 is a flow chart depicting the preferred method of fuel identification in an internal combustion engine adapted for using a fuel emulsion in accordance with the present invention; and FIG. 2 is a flow chart depicting an alternate method of fuel identification in an internal combustion engine adapted for using a fuel emulsion;

DETAILED DESCRIPTION OF THE PREFERRED EMBODIMENTS

The following description is of the best mode presently contemplated for carrying out the invention. This description is not to be taken in a limiting sense, but is made merely for the purpose of describing the general principals of the invention. The scope and breadth of the invention should be determined with reference to the claims.

Turning now to the drawings and particularly to FIG. 1, there is shown a block diagram or flow chart depicting fuel identification system logic and method of fuel identification for an electronically controlled compression ignition engine (i.e. diesel engine) adapted for using a fuel emulsion as a source of fuel. As seen therein, the fuel detection system and method is based on programming logic contained within the electronic control module (ECM) in a diesel engine.

The logic embodied in the disclosed system and method of FIG. 1 is based on the well-known fact that a diesel engine requires a given amount of fuel energy to idle. For a fuel having a fixed or constant final heating value, this translates to a fixed or constant fuel flow rate to the engine. The quantity of fuel injected and the rate at which the fuel is consumed by the engine is directly related to the duration of time that each injector is allowed to deliver fuel to the combustion chamber. This fuel injection duration is commonly referred to as the fuel 'rack'. For a given engine configuration and a given fuel, the fuel flow and thus the fuel injection duration needed to idle is approximately fixed or nearly constant. However, the fuel flow rate and fuel rack may vary slightly based on other engine parameters such as oil temperature, coolant temperature, inlet air temperature, fuel heating value, and air filter and back-pressure conditions.

Since diesel fuel has a much higher final heating value than a comparable amount of fuel emulsion containing an appreciable amount of water (e.g. 10% water or higher), the engine requires less fuel flow and less fuel rack to idle when operating on diesel fuel than when operating on a water-containing fuel emulsion. This is true even considering the fuel flow variations required due to engine operating conditions as measured or indicated by parameters such as coolant temperature, oil temperature, inlet air temperature, and back-pressure.

Turning now to FIG. 1, the fuel detection logic is preferably incorporated within the engine control module (ECM) of an electronically controlled compression ignition engine, i.e. a diesel engine. The fuel detection logic is shown as a flow chart depicting the various steps involved in detecting or identifying the fuel used within an engine. The fuel detection logic may be performed on a continuing basis as long as the engine is running or may be initiated upon the occurrence of a particular event, such as fueling of a vehicle, or even initiated on a random or periodic basis.

In either situation, once the fuel detection logic sequence is initiated (Block 20), the first step in the presently disclosed method for detecting the fuel used within an engine involves measuring various engine operating parameters such as inlet air temperature and pressure, oil and coolant temperatures, engine back-pressure, and engine operating speed (Block 22).

Next, the engine speed is compared to prescribed minimum and maximum engine idle speed values, stored within the ECM (Block 24). If the measured engine speed is not equal to or between the minimum and maximum engine idle speed values (NO branch of Block 24), the fuel detection logic returns to the initial step (Block 22) within the fuel detection logic. If however, the measured engine speed is equal to or falls between the minimum and maximum engine idle speed values (YES branch of Block 24), the fuel detection logic proceeds to the step in the illustrated process. In this manner, the fuel detection logic requires the engine to be operating at a prescribed operating condition, such as engine idling condition, prior to beginning the fuel detecting algorithms.

The third step of the illustrated fuel detection logic sequence compares various engine temperatures, such as oil temperature or coolant temperature, to pre-selected temperature values (Block 26) to ascertain whether the engine is sufficiently warmed up. If the measured temperature of the oil or coolant is above a specified value that indicates the engine is sufficiently warm, the fuel detection logic sequence proceeds to the next step (YES branch of Block 26). If however, the measured temperature is below the specified engine warmed up value (NO branch of Block 26), the fuel detection logic returns to the initial step (Block 22) and repeats the aforementioned sequence of steps. In this manner, the fuel detection logic has a built in time delay that allows the engine to be sufficiently warm prior to detecting the fuel.

Once the engine is sufficiently warm and the engine is running at the prescribed operating condition (e.g. idling speed), the fuel detection algorithm portion of the fuel detection logic is initiated. The fuel detection algorithm portion begins by ascertaining the actual fuel rack or fuel injection duration at the prescribed operating condition (Block 30). The ECM proceeds to calculate the minimum fuel injection duration or fuel rack (Block 32) based on the measured engine parameters, obtained in the initial step of the fuel detection logic (Block 22). This step can be accomplished using standard look up tables within the ECM of the engine or by other means generally known to those persons skilled in the art.

Having calculated or otherwise determined the minimum fuel injection duration or fuel rack (Block 32) based on the measured engine parameters, the ECM proceeds to compare the actual fuel injection duration or fuel rack (ascertained in Block 30) with the calculated minimum fuel injection duration or fuel rack based on measured engine parameters (Block 34). If the actual fuel injection duration or actual fuel rack is less than the minimum fuel injection duration or minimum fuel rack (YES branch of Block 34), an inappropriate fuel or a fuel other than a water-containing fuel emulsion is detected as being used in the engine (Block 36).

Conversely, if the actual fuel injection duration or actual fuel rack is greater than or equal to the minimum fuel injection duration or minimum fuel rack (NO branch of Block 34), the fuel is determined to be an acceptable fuel or a proper fuel emulsion and the fuel detection logic returns to the initial step (Block 22) and repeats the aforementioned sequence of steps. The process is then repeated as often as is deemed appropriate.

As indicated throughout this disclosure, where the ECM detects a fuel other than the fuel emulsion designed for the engine, the fuel detection system, and in particular the ECM, sends appropriate control signal to the unit injectors that limits the maximum rack of the engine or imposes some disabling condition on the engine. Additionally or alternatively, the ECM may record the incident of fuel tampering by setting a fuel tampering flag together with the date, time, and duration values for subsequent action. In fact, it may be advisable to modify the aforementioned fuel detection logic to require a plurality of incidents of fuel tampering prior to disabling the engine. Additional changes to the described logic sequence and fuel detection initiating criteria may be included. Such changes or modifications are fully contemplated by this disclosure and the above-described fuel detection sequence should be taken as a mere example of how one may achieve the objective of electronically detecting the fuel used within an engine.

Turning now to FIG. 2 there is shown a block diagram or flow chart depicting an alternate embodiment fuel detection system and method for an electronically controlled diesel engine adapted for using a fuel emulsion as a source of fuel. In many respects, the fuel detection system and method of FIG. 2 is similar to that disclosed above, with reference to FIG. 1, except for the engine operating parameter used as the basis for detecting or differentiating between said fuel emulsion and fuels other than said fuel emulsion.

As seen in FIG. 2, the fuel detection logic is shown as a flow chart depicting the various steps involved in detecting or identifying the fuel used within an engine. As with the previously disclosed embodiment, the fuel detection logic may be performed on a continuing basis, on occurrence of a particular event, or initiated on a random or periodic basis.

Once the fuel detection logic sequence is initiated (Block 40), the first step in the alternate disclosed method involves measuring various engine operating parameters including engine boost pressure (Block 42). Next, the measured engine boost pressure is compared to prescribed minimum and maximum engine boost pressure values, stored within the ECM (Block 44). If the measured engine boost pressure is not equal to or between the minimum and maximum engine boost pressure values (NO branch of Block 44), the fuel detection logic returns to the initial step (Block 42) within the fuel detection logic. If however, the measured engine speed is equal to or falls between the minimum and maximum engine boost pressure values (YES branch of Block 44), the fuel detection logic proceeds to the step in the process. In this manner, the fuel detection logic requires the engine to be operating at a prescribed range of engine boost pressure conditions, prior to beginning the fuel detecting algorithms.

Once the engine is running within the prescribed operating conditions, the fuel detection algorithm portion of the fuel detection logic is initiated. The fuel detection algorithm portion begins by ascertaining the actual fuel rack or fuel injection duration at the prescribed engine boost level (Block 50). The ECM proceeds to calculate the appropriate range of fuel injection duration values (Block 52) based on the measure engine boost pressure, obtained in the initial step of the fuel detection logic (Block 42). This step can be accomplished using standard look up tables within the ECM or by other means generally known to persons skilled in the art.

Having calculated or otherwise determined the appropriate range of fuel injection duration values (Block 52) based on the measured engine boost pressure, the ECM proceeds to compare the actual fuel injection duration (ascertained in Block 50) with the calculated range of fuel injection duration values based on the measured engine boost pressure (Block 54). If the actual fuel injection duration is outside the range of fuel injection duration values (YES branch of Block 54), an inappropriate fuel or a fuel other than a water-containing fuel emulsion is detected as being used in the engine.

Conversely, if the actual fuel injection duration is within the identified range of fuel injection duration values (NO branch of Block 54), the fuel is determined to be an acceptable fuel or a proper fuel emulsion and the fuel detection logic returns to the initial step (Block 42) and repeats the aforementioned sequence of steps. The process is then repeated as often as is deemed appropriate.

As indicated above, with reference to the embodiment of FIG. 1, if the ECM detects a fuel other than the fuel emulsion designed for the engine, the ECM preferably sends a control signal to the unit injectors that limits the maximum rack of the engine or imposes some disabling condition on the engine. The ECM may also record the incident of fuel tampering by setting a fuel tampering flag together with date, time, and other data for subsequent action (Block 56).

The three step 'measure engine boost; calculate appropriate fuel rack; and compare actual fuel rack to calculated fuel rack' logic shown and described with reference to FIG. 2 may be reversed from that described above and still operate to accurately detect the fuel used within the engine. Specifically, one can measure or otherwise ascertain the fuel rack or fuel duration, calculate the appropriate range of boost pressures for the engine where a fuel emulsion is used, and compare the actual boost pressures to the calculated boost pressures. If the actual boost pressure is outside the range of calculated boost levels, an improper or unauthorized fuel could be in use.

The above-identified methods and systems for the identification of fuel in an engine can be utilized alone or in conjunction with other fuel system controlling techniques. Moreover, each of the specific steps involved in the processes, described herein are easily modified or tailored to meet the peculiar design and operational requirements of the particular engine and the anticipated operating environment in which the engine is used.

From the foregoing, it should be appreciated that the invention thus provides a method and system for the detection of fuel used in an electronically controlled engine. While the invention disclosed herein has been described by means of specific embodiments and processes associated therewith, numerous modifications and variations can be made thereto by those skilled in the art without departing from the scope of the invention as set forth in the claims or sacrificing all its material advantages.

What is claimed is:

1. A system for identifying the use of selected fuels in an electronically controlled engine adapted to use a fuel emulsion, said anti-tampering device comprising:

an engine sensor adapted to measure a at least one prescribed engine operating characteristic comprising of the group: detection of an engine speed; detection of an inlet air temperature; detection of an engine temperature; detection of an engine back pressure conditions; detecting an engine boost pressure; and metering of fuel quantity delivered to said engine;

an engine control module adapted to receive an input from said engine sensor, said input corresponding to said engine operating characteristic;

said engine control module adapted for metering fuel quantity delivered to said engine based, in part on said engine operating characteristic;

said engine control module adapted to differentiate between said fuel emulsion and fuels other than said fuel emulsion based on at least one characteristic from a group comprised of: the characteristic of fuel quantity delivered to said engine when said engine speed sensor indicates said engine is operating at idle; and the characteristic of the said fuel quantity delivered to said engine at specified engine operating characteristics of a specified engine boost pressure; and said engine control module further adapted to produce a signal that disables said engine when said engine control module determines the occurrence of one said fuel quantity characteristic.

2. A method for identifying the use of other fuels in an electronically controlled engine adapted to use a fuel emulsion, the method comprising the steps of:

measuring a prescribed engine operating characteristic;

metering a fuel quantity delivered to said engine based, in part on said engine operating characteristic of engine speed;

determining said fuel used in said engine based on said fuel quantity delivered to said engine based at least one engine characteristic form a group comprised of engine idle, engine temperature, engine back pressure conditions, boost pressure of said engine;

disabling said engine when said fuel is determined to be other than said fuel emulsion.

\* \* \* \* \*